United States Patent
Tatsuno

(10) Patent No.: US 8,901,473 B2
(45) Date of Patent: Dec. 2, 2014

(54) PROJECTION OPTICAL SYSTEM HAVING AN APERTURE TO LIMIT QUANTITY OF LIGHT TO A REFRACTIVE OPTICAL SYSTEM, AND IMAGE DISPLAY DEVICE USING THE SAME

(71) Applicant: Hibiki Tatsuno, Kawasaki (JP)

(72) Inventor: Hibiki Tatsuno, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 204 days.

(21) Appl. No.: 13/659,104

(22) Filed: Oct. 24, 2012

(65) Prior Publication Data

US 2013/0107232 A1    May 2, 2013

(30) Foreign Application Priority Data

Oct. 28, 2011  (JP) ................. 2011-237162

(51) Int. Cl.
   *H01L 27/00* (2006.01)
   *G02B 13/16* (2006.01)
   *G02B 17/08* (2006.01)
   *G03B 21/28* (2006.01)

(52) U.S. Cl.
   CPC ............... *G03B 21/28* (2013.01); *G02B 13/16* (2013.01); *G02B 17/0852* (2013.01)
   USPC ...................... 250/208.1; 250/216

(58) Field of Classification Search
   USPC ............ 250/208.1, 216, 239; 359/649–651, 359/726–738; 353/79, 98, 99, 119
   See application file for complete search history.

(56) References Cited

U.S. PATENT DOCUMENTS

| | | | |
|---|---|---|---|
| 6,631,994 B2 | 10/2003 | Suzuki et al. | |
| 6,824,274 B2 | 11/2004 | Suzuki et al. | |
| 6,994,437 B2 | 2/2006 | Suzuki et al. | |
| 7,230,774 B2 | 6/2007 | Suzuki et al. | |
| 7,572,014 B2 | 8/2009 | Suzuki et al. | |
| 7,586,687 B2 * | 9/2009 | Yoshikawa et al. | 359/649 |
| 7,701,639 B2 | 4/2010 | Hisada et al. | |
| 8,002,419 B2 | 8/2011 | Amano et al. | |
| 8,087,789 B2 | 1/2012 | Amano et al. | |
| 2004/0156117 A1 | 8/2004 | Takaura et al. | |

(Continued)

FOREIGN PATENT DOCUMENTS

| | | |
|---|---|---|
| CN | 1906519 A | 1/2007 |
| CN | 101256273 A | 9/2008 |

(Continued)

OTHER PUBLICATIONS

Office Action issued Aug. 20, 2014 in Chinese Patent Application 2012104209430 (with English translation).

*Primary Examiner* — Que T Le

(74) *Attorney, Agent, or Firm* — Oblon, Spivak, McClelland, Maier & Neustadt, L.L.P.

(57) ABSTRACT

A projection optical system that is used for an image display device having an image display element, includes a refractive optical system that includes a plurality of lenses; an aperture that limits a quantity of light led to the refractive optical system from the image display element; a lens group that is arranged between the image display element and the aperture, has a positive refractive power, and has low field curvature with respect to the image display element; and a mirror optical system that has a concave mirror arranged on an opposite side from the image display element across the refractive optical system, the aperture, and the lens group.

17 Claims, 19 Drawing Sheets

(56) References Cited

U.S. PATENT DOCUMENTS

| | | |
|---|---|---|
| 2004/0184160 A1 | 9/2004 | Nishina et al. |
| 2005/0185288 A1 | 8/2005 | Nishina et al. |
| 2005/0195492 A1 | 9/2005 | Nishina et al. |
| 2005/0195493 A1 | 9/2005 | Nishina et al. |
| 2006/0193036 A1 | 8/2006 | Suzuki |
| 2008/0079915 A1 | 4/2008 | Amano et al. |
| 2008/0192208 A1 | 8/2008 | Benoit et al. |
| 2011/0267589 A1 | 11/2011 | Amano et al. |
| 2012/0154768 A1 | 6/2012 | Tatsuno |
| 2012/0162753 A1 | 6/2012 | Tatsuno |

FOREIGN PATENT DOCUMENTS

| | | |
|---|---|---|
| JP | 3727543 | 10/2005 |
| JP | 2007-183671 | 7/2007 |
| JP | 2007-316674 | 12/2007 |
| JP | 2008-096762 | 4/2008 |
| JP | 2008-522229 | 6/2008 |
| JP | 2009-145672 | 7/2009 |
| JP | 4467609 | 3/2010 |

* cited by examiner

FIG. 7

※Y-Z CROSS SECTION IS CROSS SECTION INCLUDING OPTICAL AXIS Z AND SHORT DIRECTION OF DMD

| SURFACE NUMBER | CURVATURE RADIUS | DISTANCE | REFRACTIVE INDEX (d LINE) | ABBE NUMBER | APERTURE RADIUS | ECCENTRICITY Y (EDGE PART OF LV - OPTICAL AXIS) | ECCENTRICITY α (CROSS SECTION INCLUDING OPTICAL AXIS Z AND SHORT DIRECTION OF LV) | ASPHERICAL SURFACE |
|---|---|---|---|---|---|---|---|---|
| LV(0) | 1.0E+18 | 1.110 | | | | 0 | 0 | |
| 1 | 1.0E+18 | 1.050 | 1.516798 | 64.10 | | 0 | 0 | |
| 2 | 1.0E+18 | 42.000 | | | | 0 | 0 | |
| 3 | 1.0E+18 | 0.000 | | | | 0 | 0 | |
| 4 | 19.5962 | 4.340 | 1.517600 | 63.5 | | -1.580 | 0 | ● |
| 5 | -241.1864 | 1.001 | | | | -1.580 | 0 | ● |
| APERTURE | | 0.900 | | | 7.5 | -1.580 | 0 | |
| 7 | 60.1942 | 0.900 | 1.883000 | 40.80 | | -1.580 | 0 | |
| 8 | 12.3469 | 5.004 | 1.487489 | 70.44 | | -1.580 | 0 | |
| 9 | -20.3159 | 0.100 | | | | -1.580 | 0 | |
| 10 | -51.6192 | 5.158 | 1.73223 | 38.16 | | -1.580 | 0 | |
| 11 | 60.4067 | 0.105 | | | | -1.580 | 0 | |
| 12 | 19.9488 | 7.246 | 1.58189 | 40.80 | | -1.580 | 0 | |
| 13 | -16.1078 | 5.647 | 1.904000 | 31.30 | | -1.580 | 0 | |
| 14 | -29.3842 | 6.617 | | | | -1.580 | 0 | |
| 15 | 1.0E+18 | 0.000 | | | | -1.580 | 0 | |
| 16 | -108.6497 | 1.559 | 1.502194 | 68.83 | | -1.580 | 0 | |
| 17 | 30.8627 | 0.300 | | | | -1.580 | 0 | |
| 18 | 17.0008 | 5.384 | 1.706797 | 29.84 | | -1.580 | 0 | |
| 19 | -73.3297 | 1.689 | | | | -1.580 | 0 | |
| 20 | -32.9794 | 1.900 | 1.904000 | 31.30 | | -1.580 | 0 | ● |
| 21 | 16.2674 | 4.097 | | | | -1.580 | 0 | ● |
| 22 | -20.3660 | 1.555 | 1.531590 | 55.8 | | -1.580 | 0 | ● |
| 23 | -32.2240 | 9.000 | | | | -1.580 | 0 | ● |
| 24 | -16.2157 | 3.763 | 1.531590 | 55.8 | | -1.580 | 0 | ● |
| | -14.6038 | 114.520 | | | | -66.880 | -50.300 | |
| CONCAVE MIRROR | | | | | | | 90 | |
| DUST-PROOF GLASS | | | | | | | 90 | |
| DUST-PROOF GLASS | | | | | | | | |

FIG. 8

| SURFACE NUMBER | 3 | 4 | 21 | 22 | 23 | 24 |
|---|---|---|---|---|---|---|
| 4TH-ORDER COEFFICIENT (A) | 6.754533E-05 | 8.998097E-05 | 1.265734E-04 | 8.348544E-05 | 1.581804E-05 | 2.432986E-05 |
| 6TH-ORDER COEFFICIENT (B) | 1.648657E-07 | 2.424654E-07 | 2.805398E-06 | 2.785732E-07 | -1.042775E-06 | -6.431941E-07 |
| 8TH-ORDER COEFFICIENT (C) | 4.628668E-09 | 2.676809E-09 | -1.175890E-07 | -1.609644E-08 | 8.674213E-09 | 1.023597E-08 |
| 10TH-ORDER COEFFICIENT (D) | -2.239349E-11 | 3.752763E-11 | 2.477547E-09 | 2.014444E-10 | -1.679850E-11 | -1.315066E-10 |
| 12TH-ORDER COEFFICIENT (E) | -2.251519E-13 | -9.623309E-13 | -2.797101E-11 | -6.772161E-13 | -6.764244E-14 | 1.167487E-12 |
| 14TH-ORDER COEFFICIENT (F) | 6.999759E-15 | 1.037164E-14 | 1.588011E-13 | -5.756977E-15 | 4.660086E-18 | -5.466930E-15 |
| 16TH-ORDER COEFFICIENT (G) | 7.019872E-18 | 6.210838E-17 | -3.648928E-17 | 2.568936E-17 | 2.560544E-18 | 1.082869E-17 |

FIG. 9A

| | |
|---|---|
| C | 0 |
| k:Conic constant | 0 |
| C2:y | 0 |
| C3:x**2 | -5.865323E-03 |
| C4:y**2 | -2.337578E-03 |
| C5:x**2*y | -3.423455E-05 |
| C6:y**3 | -3.496337E-06 |
| C7:x**4 | -1.984721E-07 |
| C8:x**2*y**2 | -4.600061E-07 |
| C9:y**4 | -9.555183E-08 |
| C10:x**4*y | -3.905704E-09 |
| C11:x**2*y**3 | -5.817043E-09 |
| C12:y**5 | 1.659872E-09 |
| C13:x**6 | 1.148399E-10 |
| C14:x**4*y**2 | -1.269345E-11 |
| C15:x**2*y**4 | 8.714990E-11 |
| C16:y**6 | -1.567636E-10 |
| C17:x**6*y | 4.093437E-12 |
| C18:x**4*y**3 | 1.897754E-12 |
| C19:x**2*y**5 | -3.222636E-12 |
| C20:y**7 | 3.718560E-12 |
| C21:x**8 | -1.014542E-13 |
| C22:x**6*y**2 | 3.360712E-14 |
| C23:x**4*y**4 | -1.367558E-13 |
| C24:x**2*y**6 | 1.943463E-14 |
| C25:y**8 | 4.641221E-14 |
| C26:x**8*y | -3.087946E-15 |
| C27:x**6*y**3 | -2.823477E-15 |
| C28:x**4*y**5 | 1.137909E-15 |
| C29:x**2*y**7 | -3.460801E-15 |
| C30:y**9 | -2.402033E-15 |
| C31:x**10 | 4.887862E-17 |
| C32:x**8*y**2 | -5.944002E-17 |
| C33:x**6*y**4 | 1.094273E-17 |
| C34:x**4*y**6 | 2.200470E-16 |
| C35:x**2*y**8 | -5.888782E-18 |
| C36:y**10 | -1.641960E-17 |

FIG. 9B

| | |
|---|---|
| C37: x**10*y | 1.046341E-18 |
| C38: x**8*y**3 | 2.427625E-18 |
| C39: x**6*y**5 | 9.504204E-19 |
| C40: x**4*y**7 | -3.764637E-18 |
| C41: x**2*y**9 | 5.341394E-18 |
| C42: y**11 | 8.806410E-19 |
| C43: x**12 | -1.283673E-20 |
| C44: x**10*y**2 | 3.060072E-20 |
| C45: x**8*y**4 | 2.286890E-20 |
| C46: x**6*y**6 | -1.620773E-19 |
| C47: x**4*y**8 | -1.025548E-21 |
| C48: x**2*y**10 | -9.869502E-20 |
| C49: y**12 | 8.386263E-21 |
| C50: x**12*y | -1.476957E-22 |
| C51: x**10*y**3 | -1.098712E-21 |
| C52: x**8*y**5 | -5.367462E-22 |
| C53: x**6*y**7 | 3.022370E-21 |
| C54: x**4*y**9 | -1.622007E-21 |
| C55: x**2*y**11 | -2.493170E-22 |
| C56: y**13 | -4.072400E-22 |
| C57: x**14 | 1.411002E-24 |
| C58: x**12*y**2 | -5.514866E-24 |
| C59: x**10*y**4 | -4.135369E-24 |
| C60: x**8*y**6 | 2.728687E-23 |
| C61: x**6*y**8 | -5.081023E-25 |
| C62: x**4*y**10 | 4.991359E-23 |
| C63: x**2*y**12 | 1.757988E-23 |
| C64: y**14 | 3.608424E-24 |
| C65: x**14*y | 4.403313E-27 |
| C66: x**12*y**3 | 1.886875E-25 |
| C67: x**10*y**5 | -6.390447E-27 |
| C68: x**8*y**7 | -3.463802E-25 |
| C69: x**6*y**9 | -1.941834E-25 |
| C70: x**4*y**11 | -3.522594E-25 |
| C71: x**2*y**13 | -1.050086E-25 |
| C72: y**15 | -8.728168E-27 |

FIG. 18

※Y-Z CROSS SECTION IS CROSS SECTION INCLUDING OPTICAL AXIS Z AND SHORT DIRECTION OF DMD

| SURFACE NUMBER | CURVATURE RADIUS | DISTANCE | REFRACTIVE INDEX (d LINE) | ABBE NUMBER | APERTURE RADIUS | ECCENTRICITY Y (EDGE PART OF LV - OPTICAL AXIS) | ECCENTRICITY α (CROSS SECTION INCLUDING OPTICAL AXIS Z AND SHORT DIRECTION OF LV) | ASPHERICAL SURFACE |
|---|---|---|---|---|---|---|---|---|
| LV(0) | 1.0E+18 | 1.110 | | | | | 0 | |
| 1 | 1.0E+18 | 1.050 | 1.516798 | 64.10 | | | 0 | |
| 2 | 1.0E+18 | 42.000 | | | | | 0 | |
| 3 | 1.0E+18 | 0.000 | | | | | 0 | |
| 4 | 20.4714 | 4.944 | 1.517600 | 63.5 | | -1.350 | 0 | ● |
| 5 | -205.0185 | 0.100 | | | | -1.350 | 0 | ● |
| 6 | 60.5636 | 1.586 | 1.883000 | 40.80 | | -1.350 | 0 | |
| 7 | 12.6878 | 6.269 | 1.487489 | 70.44 | | -1.350 | 0 | |
| 8 | -19.0389 | 0.432 | | | | -1.350 | 0 | |
| APERTURE | -41.5328 | 6.111 | 1.73589 | 38.47 | 7.5 | -1.350 | 0 | |
| 10 | 69.3680 | 0.100 | | | | -1.350 | 0 | |
| 11 | 19.7666 | 8.194 | 1.58144 | 40.92 | | -1.350 | 0 | |
| 12 | -15.9572 | 4.514 | 1.904000 | 31.30 | | -1.350 | 0 | |
| 13 | -29.1366 | 6.592 | | | | -1.350 | 0 | |
| 14 | 1.0E+18 | 0.000 | | | | -1.350 | 0 | |
| 15 | -99.3439 | 1.646 | 1.502194 | 68.83 | | -1.350 | 0 | |
| 16 | 31.9051 | 0.300 | | | | -1.350 | 0 | |
| 17 | 17.2398 | 5.319 | 1.706797 | 29.84 | | -1.350 | 0 | |
| 18 | -64.0915 | 1.659 | | | | -1.350 | 0 | |
| 19 | -29.5841 | 1.840 | 1.904000 | 31.30 | | -1.350 | 0 | |
| 20 | 16.8078 | 3.582 | | | | -1.350 | 0 | ● |
| 21 | -21.2354 | 1.772 | 1.531590 | 55.8 | | -1.350 | 0 | ● |
| 22 | -32.7717 | 9.261 | | | | -1.350 | 0 | ● |
| 23 | -15.8085 | 3.703 | 1.531590 | 55.8 | | -1.350 | 0 | ● |
| 24 | -14.5289 | 114.570 | | | | -1.350 | 0 | ● |
| CONCAVE MIRROR | | | | | | -66.650 | -50.300 | |
| DUST-PROOF GLASS | | | | | | | 90 | |
| DUST-PROOF GLASS | | | | | | | 90 | |

FIG. 19

| SURFACE NUMBER | 3 | 4 | 21 | 22 | 23 | 24 |
|---|---|---|---|---|---|---|
| 4TH-ORDER COEFFICIENT (A) | 6.573461E-05 | 9.097380E-05 | 1.243462E-04 | 8.569995E-05 | 1.403385E-05 | 2.169873E-05 |
| 6TH-ORDER COEFFICIENT (B) | 1.028433E-07 | 2.325013E-07 | 2.796929E-06 | 2.801230E-07 | -1.056883E-06 | -6.526010E-07 |
| 8TH-ORDER COEFFICIENT (C) | 4.598802E-09 | 2.288009E-09 | -1.177877E-07 | -1.604509E-08 | 8.626190E-09 | 1.026306E-08 |
| 10TH-ORDER COEFFICIENT (D) | -2.496291E-11 | 2.865821E-11 | 2.475616E-09 | 2.023193E-10 | -1.649325E-11 | -1.315952E-10 |
| 12TH-ORDER COEFFICIENT (E) | -3.257820E-13 | -1.031288E-12 | -2.795923E-11 | -6.801545E-13 | -6.591320E-14 | 1.166064E-12 |
| 14TH-ORDER COEFFICIENT (F) | 5.479975E-15 | 9.231269E-15 | 1.590665E-13 | -5.880727E-15 | 3.023361E-19 | -5.470575E-15 |
| 16TH-ORDER COEFFICIENT (G) | -3.266914E-18 | 1.927599E-17 | -3.700089E-16 | 2.528567E-17 | 2.396959E-18 | 1.083794E-17 |

FIG. 20A

| | |
|---|---:|
| C | 0 |
| k:Conic constant | 0 |
| C2:y | 0 |
| C3:x**2 | -5.863642E-03 |
| C4:y**2 | -2.337245E-03 |
| C5:x**2*y | -3.428304E-05 |
| C6:y**3 | -3.030076E-06 |
| C7:x**4 | -1.970781E-07 |
| C8:x**2*y**2 | -4.524687E-07 |
| C9:y**4 | -1.106953E-07 |
| C10:x**4*y | -3.797259E-09 |
| C11:x**2*y**3 | -6.234595E-09 |
| C12:y**5 | 1.701423E-09 |
| C13:x**6 | 1.162148E-10 |
| C14:x**4*y**2 | -1.254523E-11 |
| C15:x**2*y**4 | 9.194804E-11 |
| C16:y**6 | -1.507382E-10 |
| C17:x**6*y | 4.050313E-12 |
| C18:x**4*y**3 | 1.974065E-12 |
| C19:x**2*y**5 | -3.176180E-12 |
| C20:y**7 | 3.709399E-12 |
| C21:x**8 | -1.020627E-13 |
| C22:x**6*y**2 | 3.157313E-14 |
| C23:x**4*y**4 | -1.358045E-13 |
| C24:x**2*y**6 | 1.815467E-14 |
| C25:y**8 | 4.545950E-14 |
| C26:x**8*y | -3.089291E-15 |
| C27:x**6*y**3 | -2.824687E-15 |
| C28:x**4*y**5 | 1.256509E-15 |
| C29:x**2*y**7 | -3.426364E-15 |
| C30:y**9 | -2.424041E-15 |
| C31:x**10 | 4.887685E-17 |
| C32:x**8*y**2 | -5.949249E-17 |
| C33:x**6*y**4 | 1.049257E-17 |
| C34:x**4*y**6 | 2.186368E-16 |
| C35:x**2*y**8 | -5.409660E-18 |
| C36:y**10 | -1.639217E-17 |

FIG. 20B

| | |
|---|---|
| C37: x**10*y | 1.049827E-18 |
| C38: x**8*y**3 | 2.440906E-18 |
| C39: x**6*y**5 | 9.473598E-19 |
| C40: x**4*y**7 | -3.849586E-18 |
| C41: x**2*y**9 | 5.338933E-18 |
| C42: y**11 | 8.845974E-19 |
| C43: x**12 | -1.283826E-20 |
| C44: x**10*y**2 | 3.072124E-20 |
| C45: x**8*y**4 | 2.293854E-20 |
| C46: x**6*y**6 | -1.625974E-19 |
| C47: x**4*y**8 | -1.385108E-22 |
| C48: x**2*y**10 | -9.889658E-20 |
| C49: y**12 | 8.437876E-21 |
| C50: x**12*y | -1.478942E-22 |
| C51: x**10*y**3 | -1.093678E-21 |
| C52: x**8*y**5 | -5.339146E-22 |
| C53: x**6*y**7 | 3.004705E-21 |
| C54: x**4*y**9 | -1.611710E-21 |
| C55: x**2*y**11 | -2.514123E-22 |
| C56: y**13 | -4.070442E-22 |
| C57: x**14 | 1.417539E-24 |
| C58: x**12*y**2 | -5.430574E-24 |
| C59: x**10*y**4 | -4.160089E-24 |
| C60: x**8*y**6 | 2.736459E-23 |
| C61: x**6*y**8 | -9.623385E-26 |
| C62: x**4*y**10 | 4.995254E-23 |
| C63: x**2*y**12 | 1.757825E-23 |
| C64: y**14 | 3.611352E-24 |
| C65: x**14*y | 4.377514E-27 |
| C66: x**12*y**3 | 1.839696E-25 |
| C67: x**10*y**5 | -7.101170E-27 |
| C68: x**8*y**7 | -3.422019E-25 |
| C69: x**6*y**9 | -1.975393E-25 |
| C70: x**4*y**11 | -3.533979E-25 |
| C71: x**2*y**13 | -1.044157E-25 |
| C72: y**15 | -8.937379E-27 |

PROJECTION OPTICAL SYSTEM HAVING AN APERTURE TO LIMIT QUANTITY OF LIGHT TO A REFRACTIVE OPTICAL SYSTEM, AND IMAGE DISPLAY DEVICE USING THE SAME

CROSS-REFERENCE TO RELATED APPLICATIONS

The present application is based on and claims priority from Japanese Patent Application Number 2011-237162, filed Oct. 28, 2011, the disclosure of which is hereby incorporated by reference herein in its entirety.

BACKGROUND

The present invention relates to a projection optical system and an image display device using the projection optical system. The image display device is a projection-type device that uses a reflection-type light valve, and is available in various projector formats.

With reference to FIG. 1, a general constitution and function of the projection-type image display device using the reflection-type light valve will be explained.

FIG. 1 is an explanatory diagram that illustrates an optical arrangement of a general projector as the projection-type image display device.

In FIG. 1, reference codes LV, LS, IR, LN, M, CM, and POS denote a light valve, a lamp light source, an integrator rod, a lens for illumination, a mirror, a curved-surface mirror, and a projection optical system, respectively.

The light valve LV is an image display element, and is a reflection type.

The lamp light source LS has a lamp LP, and a reflector RF, and emits illumination light for illuminating the light valve LV.

The integrator rod IR, the lens for illumination LN, the mirror M, and the curved-surface mirror CM constitute an illumination optical system that leads illumination light emitted from the lamp light source LS to the light valve LV.

The integrator rod IR is a light pipe where four mirrors are combined in a tunnel manner, and reflects light that is incident from an entrance part by a mirror surface, and leads it to an exit part.

The projection optical system POS projects reflection light from the light valve LV to a projection surface such as a screen or the like, and enlarges and forms an image displayed on the light valve LV on the projection surface.

The light valve LV is a DMD (Digital Micromirror Device), for example, on which micro mirrors are arranged in an array manner. A normal line of each micromirror is independently changeable in the range of ±12 degrees, for example.

The reflector R reflects light emitted from the lamp LP, and the light converges towards the entrance part of the integrator rod IR. The light incident from the entrance part is repeatedly reflected in the integrator rod IR and led to the exit part, and is emitted as light of uniform illuminance where nonuniformity of illuminance is uniformed from the exit part.

The light emitted from the integrator rod IR illuminates the light valve LV via the lens for illumination LN, the mirror M, and the curved-surface mirror CM of the illumination optical system.

The emitted light from the exit part of the integrator rod IR is taken as a surface light source of uniform illuminance where nonuniformity of a quantity of light is uniformed for the lens for illumination LN and the curved-surface mirror CM of the illumination optical system, and an image of the surface light source is formed on the light valve LV. That is, the light valve LV is illuminated by illumination light of uniform illuminance.

For example, it is defined such that when an inclination angle of a micro mirror on the light valve LV is −12 degrees, for example, light reflected by the micro mirror is incident to the projection optical system POS, and when an inclination angle of a micro mirror on the light valve LV is +12 degrees, light reflected by the micro mirror is not incident to the projection optical system POS, and a positional relationship between the light valve LV and the projection optical system POS is defined. And additionally, an incident direction onto the light valve LV of illumination light from the curved-surface mirror CM is set.

In accordance with pixels of an image to be projected and formed on the projection surface, the inclination of each micro mirror is adjusted, and thereby the image is displayed on the light valve LV.

When an image is displayed on the light valve LV, and the light valve LV is illuminated by the illumination light in this manner, reflection light per micro mirror incident to the projection optical system POS becomes an imaging luminous flux by the projection optical system POS, and is projected and formed on the projection surface as an enlarged image of the image.

Since the light valve LV is illuminated by light of a uniform illuminance distribution, the image on the projection surface as the enlarged image also has the uniform illuminance distribution. Thus, an image is displayed on the projection surface.

The above is an explanation of image display by a general projector.

Recently, a projector, a set position of which to the projection surface is much closer than that of a conventional one, has been known (hereinafter, referred to as ultra-close-range projector).

An ultra-close-range projector has an effect of preventing glare of projection light from entering the eyes of a presenter (speaker, or the like) standing closer to a screen surface (projection surface).

Additionally, the ultra-close-range projector is set away from the audience listening to an explanation made by the presenter, therefore it is possible to remove any negative influence such as exhaust air, noise, or the like from the audience.

Projection optical systems for the ultra-close-range projector are broadly divided into two kinds: a first one that is a conventional coaxial rotationally symmetric projection optical system with a wider angle of view which shortens a distance to a projection surface, and a second one that uses a curved-surface mirror in an optical system.

The first one achieves ultra-close-range projection by using a conventional technique; however, a diameter of a lens close to the screen surface is likely to become large, and the size of a projector is likely to be increased.

On the other hand, the second one maintains the size of a projector small, and has a possibility of achieving ultra-close-range projection.

For example, Japanese Patent number 3727543, Japanese Patent Application publication number (translation for PCT application) 2008-522229, Japanese Patent number 4467609, Japanese Patent Application publication number 2009-145672, Japanese Patent number 4210314, Japanese Patent Application publication number 2007-183671, and Japanese Patent Application publication number 2008-96762 are known as examples using a curved-surface mirror in a projection optical system.

Japanese Patent Number 3727543, Japanese Patent Application publication number 2007-183671, and Japanese Patent Application publication number 2008-96762 disclose examples in which a lens system and a convex mirror are combined, and the main purpose of which is to reduce the thickness of a rear-projection TV.

Japanese Patent Application publication number 2008-522229, Japanese Patent number 4467609, Japanese Patent Application publication number 2009-145672, and Japanese Patent number 4210314 disclose examples in which a lens system and a concave mirror are combined, which achieves ultra-close-range projection.

In a projection optical system using a convex mirror, a diameter of an imaging luminous flux from the convex mirror to a screen monotonously enlarges, as is clear from FIG. 9 of Japanese Patent Application publication number 2007-183671, and so on, for example.

Therefore, considering a case of setting a dust-proof glass for convex mirror protection between the convex mirror and the screen, as to the ultra-close-range projection, enlargement of the diameter of the imaging luminous flux that monotonously enlarges is rapid, and therefore the size of the dust-proof glass is likely to be enlarged, leading to a problem in weight and cost of a projector.

The dust-proof glass is not always necessary; however, if the dust-proof glass is not used, the convex mirror is exposed. Accordingly, dust adheres to a mirror surface, the surface is scratched, or a user who touches the convex mirror and leaves fingerprints on the surface.

The above dust, scratch, and fingerprints have a high possibility of causing deterioration of brightness or image quality of a projected image.

Therefore, the projection optical system using the convex mirror is stored in a housing, and mostly used in the form of a rear projector (See FIG. 25 of Japanese Patent number 3727543, and so on).

On the other hand, in a case of using a concave mirror in the projection optical system, it is possible to converge an imaging luminous flux between the concave mirror and the screen one time. Therefore, if the dust-proof glass is placed between the concave mirror and the screen, it is possible to avoid the dust-proof glass being enlarged.

However, in the ultra-close-range projector, a distance between the concave mirror and the screen is short, and in order to display a large image, an angle of a light beam incident on the screen becomes considerably sharp.

Accordingly, if the concave mirror is used for a front projector (a projector that projects an image from the front with respect to a screen) having the dust-proof glass, the angle of the light beam incident on the dust-proof glass from the concave mirror becomes sharp, as light goes toward an edge part of an image on the screen.

Therefore, transmittance of a dust-proof glass becomes low, as light goes toward an edge part of an image on the screen, and a quantity of light in the vicinity of the edge part of the image also becomes low. That is, the closer to the vicinity of the edge part of the image on a projection screen, the lower the brightness of a projected image becomes.

As to downsizing of a projector, as illustrated in FIG. 13 of Japanese patent number 4210314, it is possible to downsize a projection optical system by inserting a flat fold mirror between a lens system and a concave mirror, and folding a light path. However, an angle of a light beam incident on the fold mirror becomes sharp (not as sharp as the light beam reflected by the concave mirror), and therefore, in the projector where the fold mirror is placed, the quantity of light in the edge part of the image on the screen becomes low also by the fold mirror.

As disclosed in Japanese Patent application publication number 2008-522229, Japanese Patent number 4467609, and Japanese Patent Application Publication number 2009-145672, if the dust-proof glass is placed obliquely, and has an oblique angle to a normal line of the screen, it is possible to slightly moderate the sharpness of an angle of a light beam toward the edge part of the image. However, in particular, in a case of the projection optical system having the fold mirror, if the dust-proof glass is placed obliquely, the dust-proof glass is likely to interfere with the fold mirror, and block a light path toward the concave mirror from the fold mirror. Additionally, in order to avoid the above, the dust-proof glass is likely to be extremely enlarged.

Japanese Patent number 3727543 discloses that "vignetting (light falloff)" by a lens frame of the projection optical system, or the like is reduced, and the size of lenses is minimized by corresponding a position of a lens surface closest to a reflection-type light valve (DMD) to a position of an entrance pupil, and giving the lens surface closest to the DMD an aperture function.

However, in a case of a projector using a reflection-type light valve, unless the position of the entrance pupil is considered, light is blocked by a lens or a mirror of the illumination optical system that illuminates the light valve, and the quantity of light around the image is decreased.

SUMMARY

An object of the present invention is to provide a projection-type image display device that has a concave mirror in a projection optical system and a dust-proof glass on an image side of the concave mirror, and performs ultra-close-range projection, and effectively increases the brightness in a peripheral part of a projected image.

In order to achieve the above object, an embodiment of the present invention provides a projection optical system that is used for an image display device having an image display element, comprising: a refractive optical system that includes a plurality of lenses; an aperture that limits a quantity of light led to the refractive optical system from the image display element; a lens group that is arranged between the image display element and the aperture, has a positive refractive power, and has low field curvature with respect to the image display element; and a mirror optical system that has a concave mirror arranged on an opposite side from the image display element across the refractive optical system, the aperture, and the lens group.

In order to achieve the above object, an embodiment of the present invention provides an image display device, comprising: an image display element; a light source; an illumination optical system that leads light emitted from the light source to the image display element; a projection optical system that projects an image displayed on the image display element and forms the image; and a dust-proof member that is provided on a side of the projection optical system where an imaging luminous flux is emitted, the projection optical system including: a refractive optical system that includes a plurality of lenses; an aperture that limits a quantity of light led to the refractive optical system from the image display element; a lens group that is arranged between the image display element and the aperture, has a positive refractive power, and has low field curvature with respect to the image display element; and a mirror optical system that has a concave mirror arranged on an opposite side from the image display element across the refractive optical system, the aperture, and the lens group.

In order to achieve the above object, an embodiment of the present invention provides an image display device, comprising: a reflection-type light valve; a lamp light source that illuminates the light valve; an illumination optical system that leads light emitted from the lamp light source to the light valve; a projection optical system that projects an image displayed on the light valve and forms the image; and a dust-proof member that is provided on a side of the projection optical system where an imaging luminous flux is emitted, the projection optical system including: a refractive optical system that includes a plurality of lenses; an aperture that limits a quantity of light led to the refractive optical system from the light valve; a lens group that is arranged between the light valve and the aperture, has a positive refractive power, and has low field curvature with respect to the light valve; and a mirror optical system that has a concave mirror arranged on an opposite side from the light valve across the refractive optical system, the aperture, and the lens group.

Figure 5A:
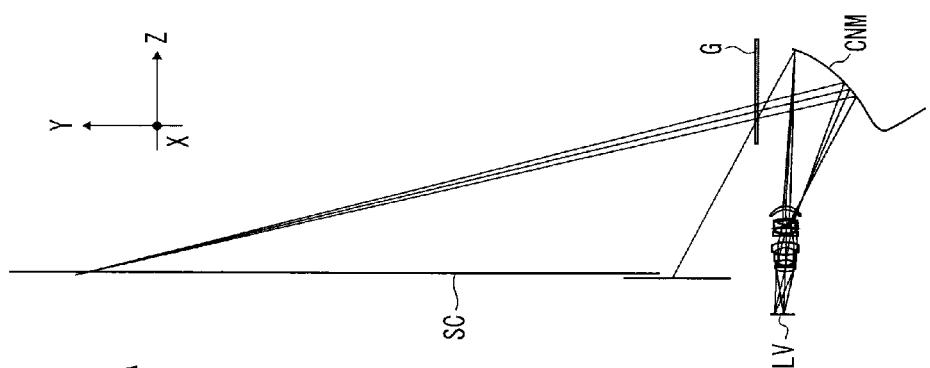
Figure 5B:
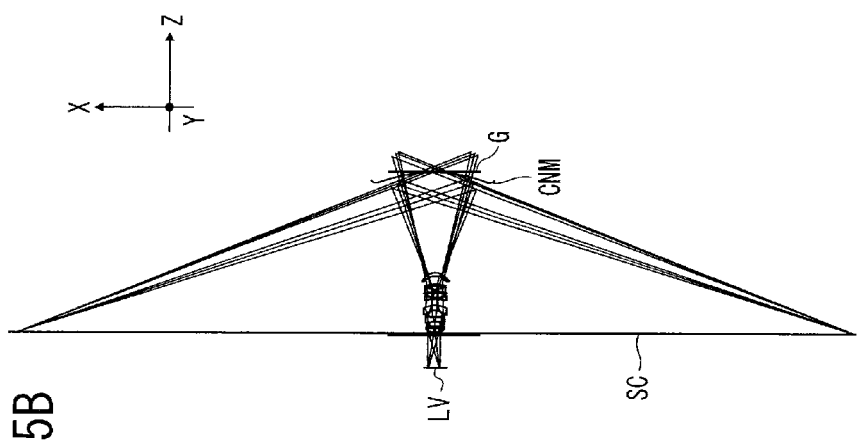

Each of FIGS. 5A and 5B is a diagram that explains an image display device according to Embodiment 1.

Figure 6:
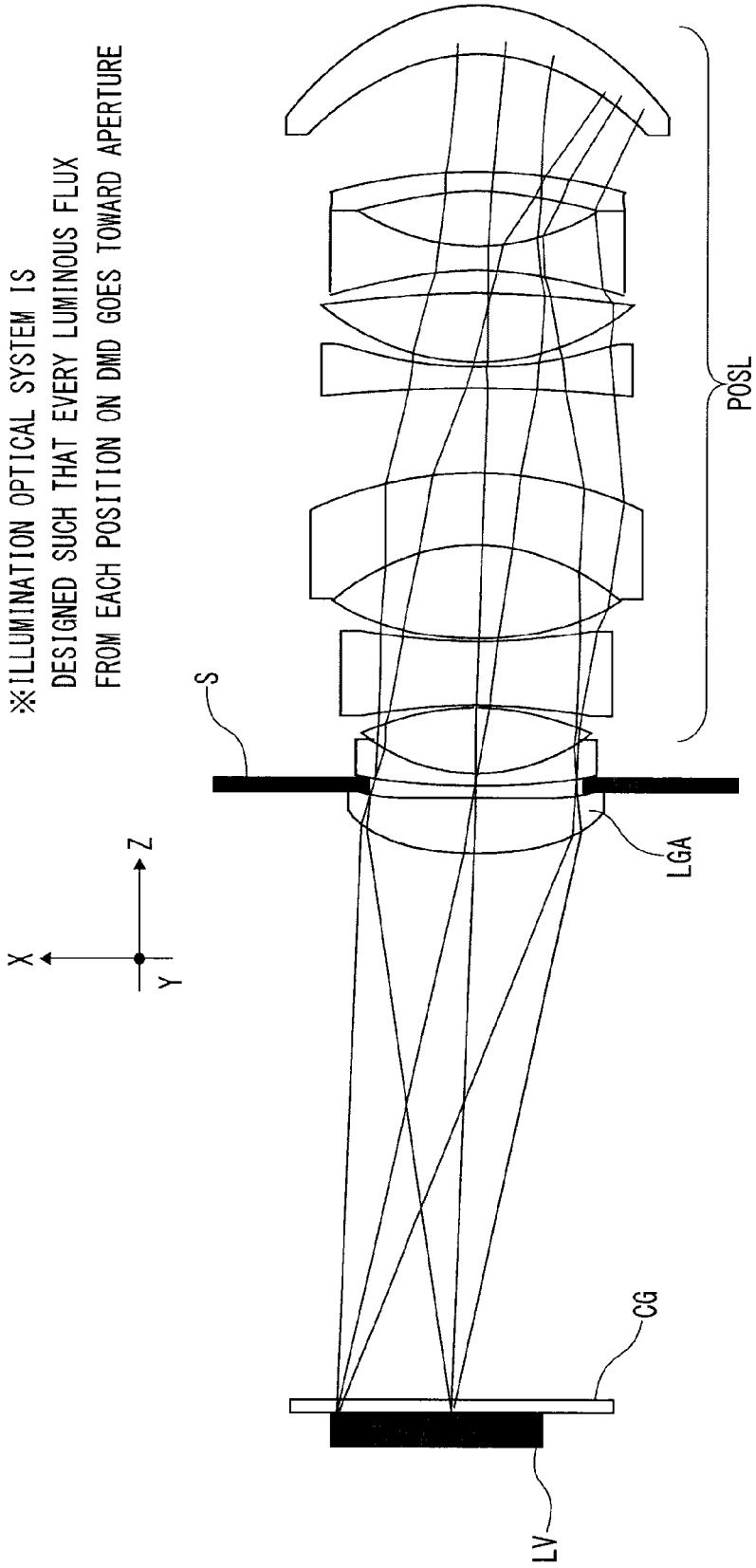

FIG. 6 is a diagram that illustrates a part of an optical arrangement of Embodiment 1.

FIG. 7 is a diagram that illustrates optical data of Embodiment 1.

FIG. 8 is a diagram that illustrates aspheric surface data of Embodiment 1.

Each of FIGS. 9A and 9B is a diagram that illustrates data of a mirror surface shape of a concave mirror of Embodiment 1.

Figure 10:
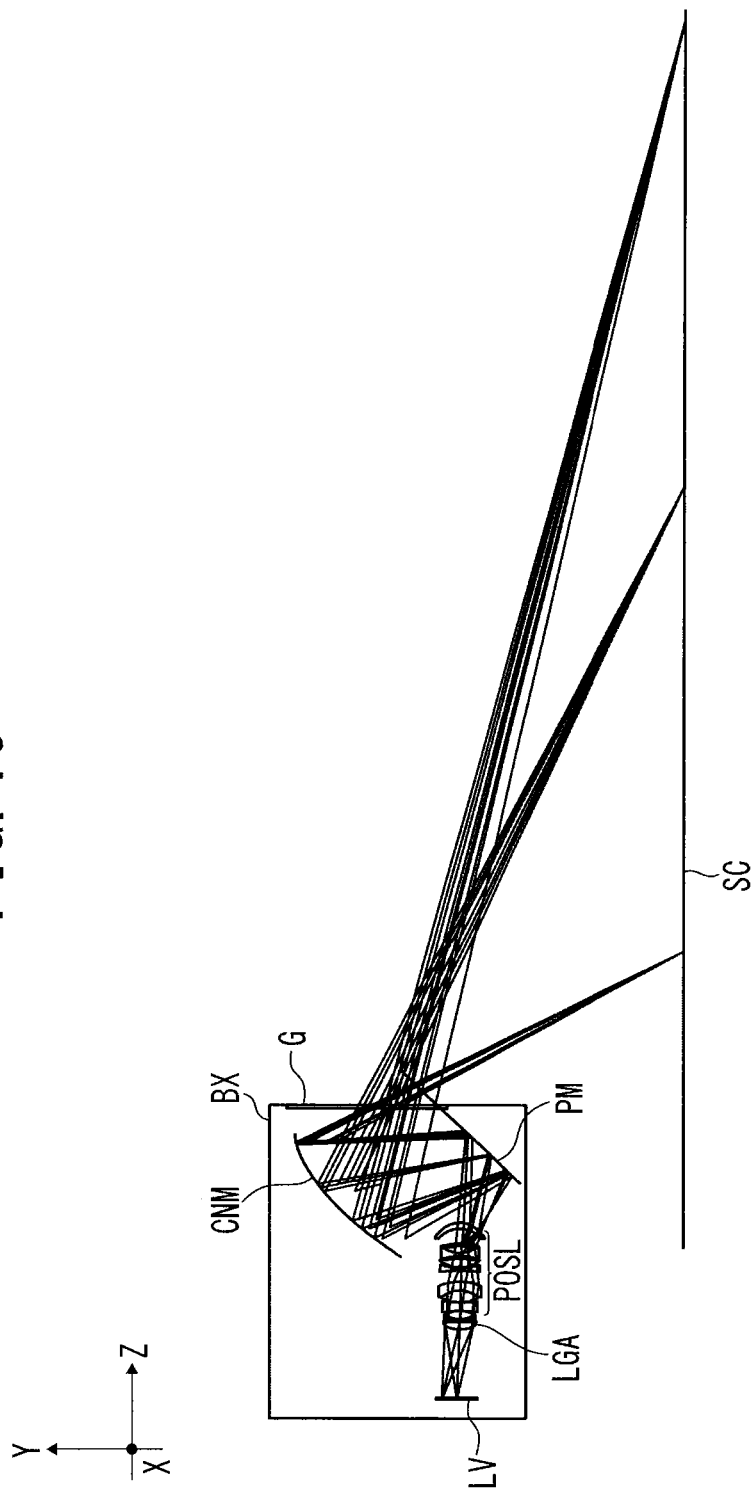

FIG. 10 is a diagram that explains an image display device according to Embodiment 2.

Figure 11:
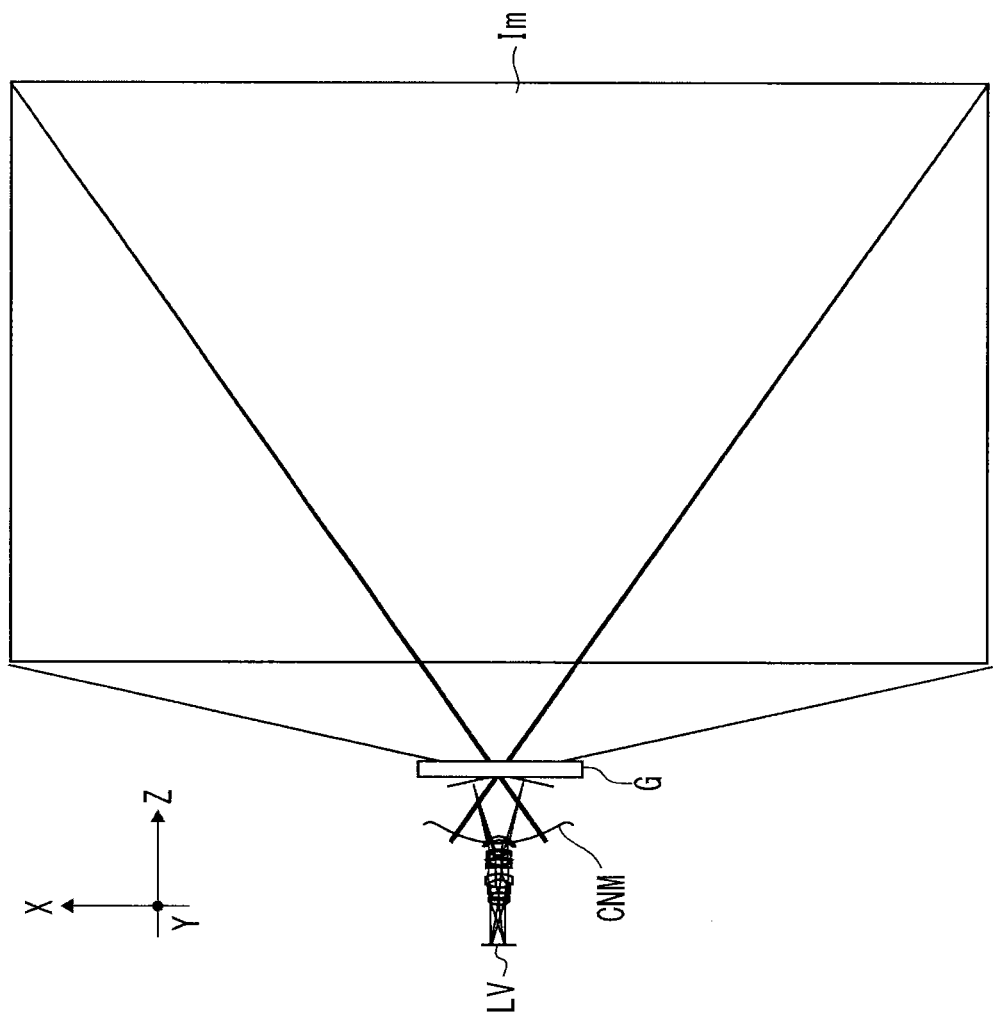

FIG. 11 is a diagram that illustrates a part of an optical arrangement of Embodiment 2.

Figure 12:
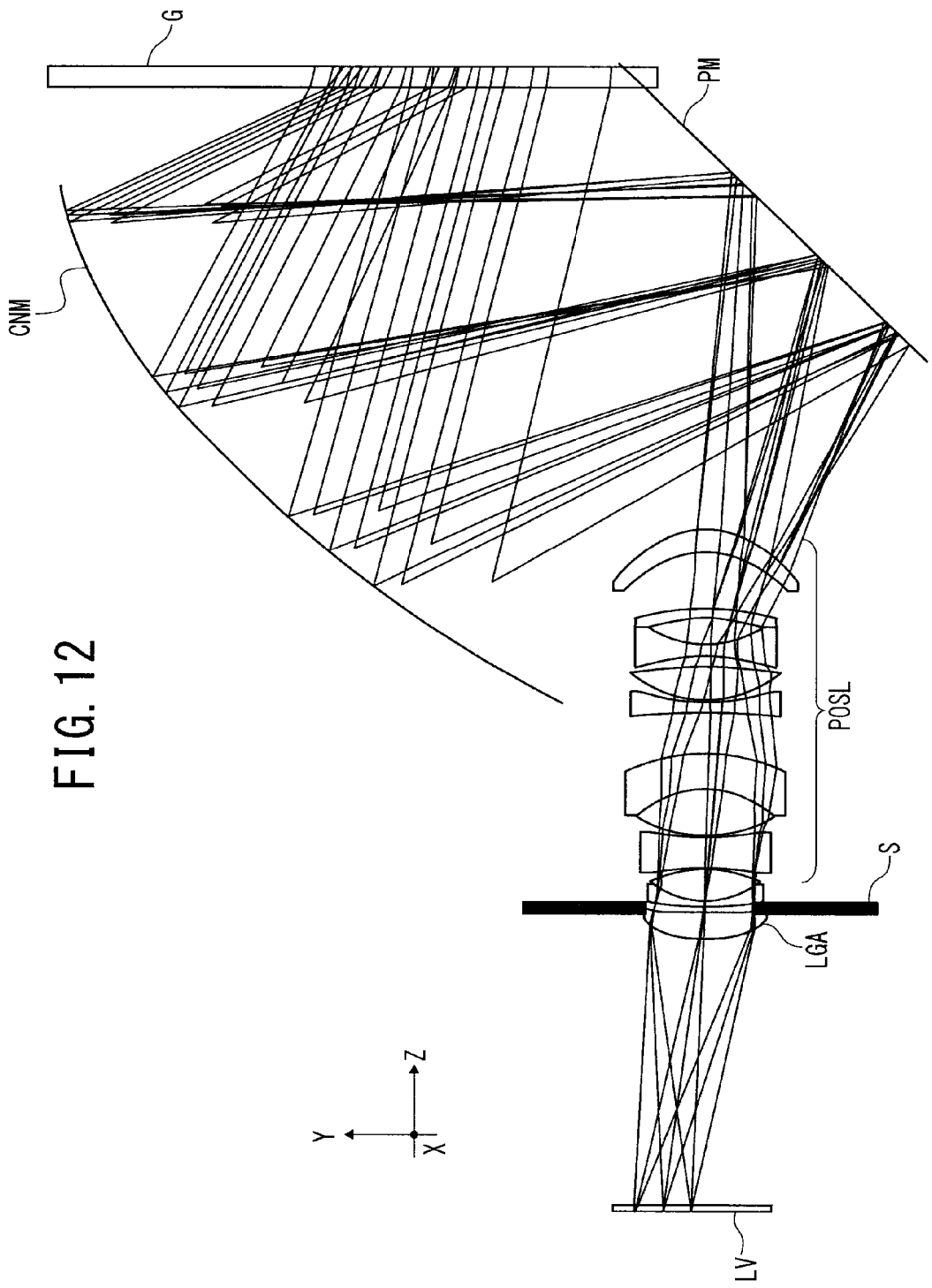

FIG. 12 is a diagram that explains Embodiment 2.

Figure 13:
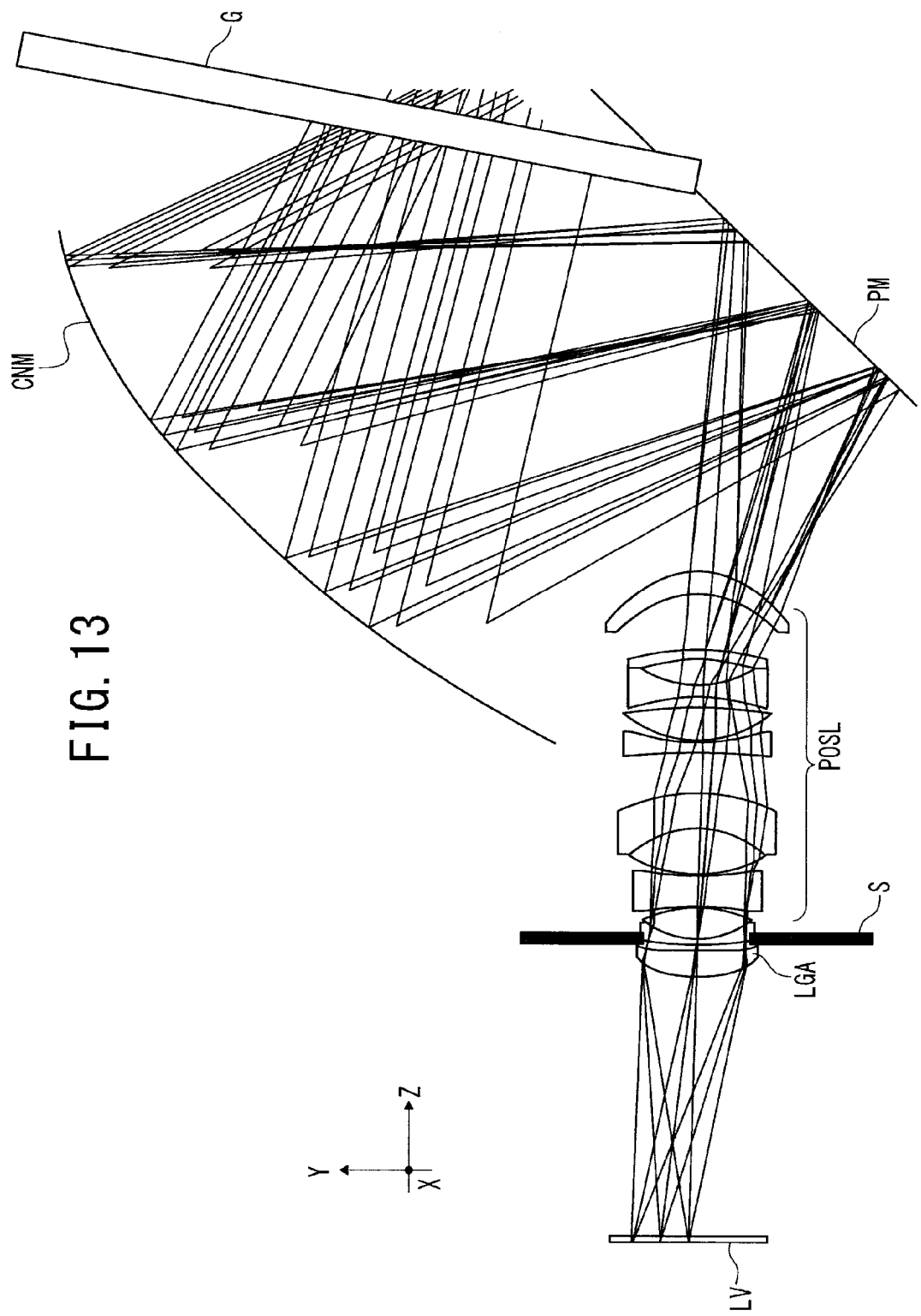

FIG. 13 is a diagram that explains a problem in an arrangement of a dust-proof glass in Embodiment 2.

Figure 14:
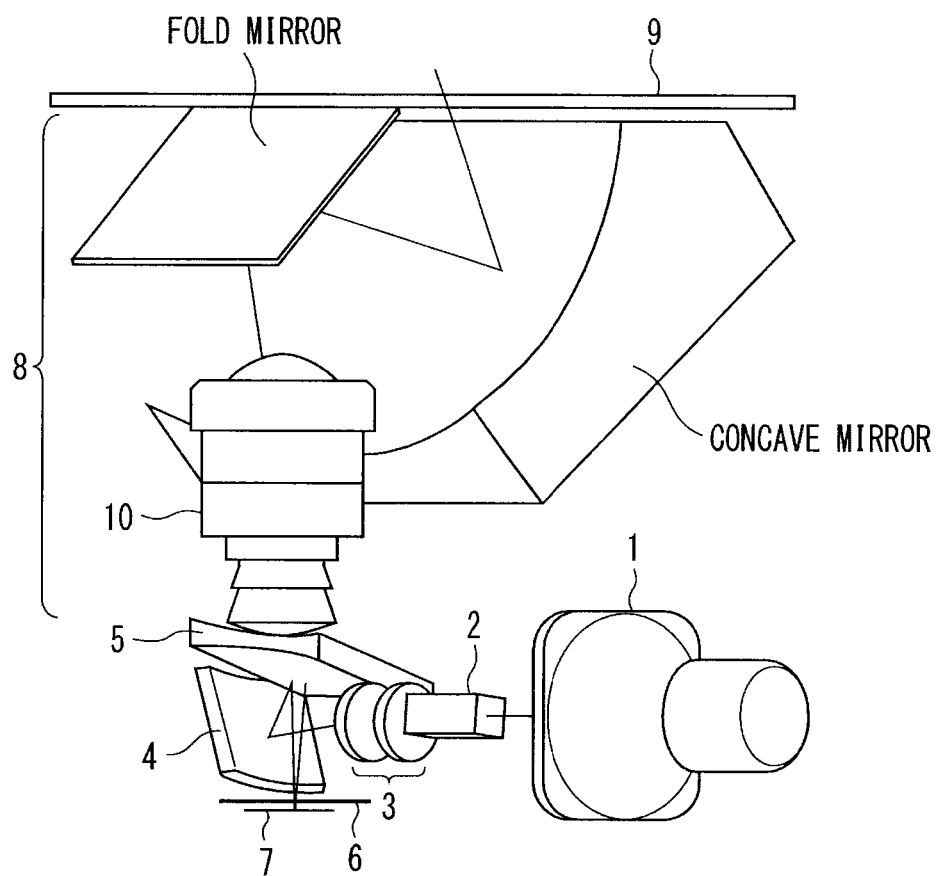

FIG. 14 is a diagram that explains an entire image display device.

Figure 15:
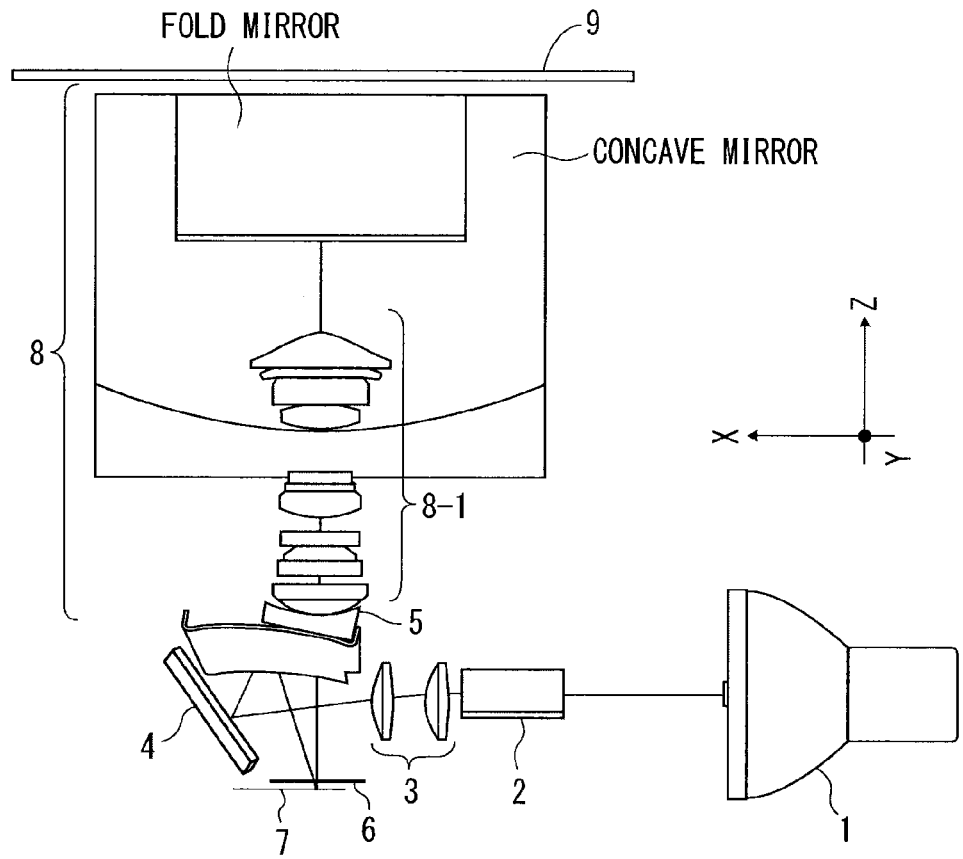

FIG. 15 is a diagram that illustrates inside of a lens barrel 10 in FIG. 14.

Figure 16:
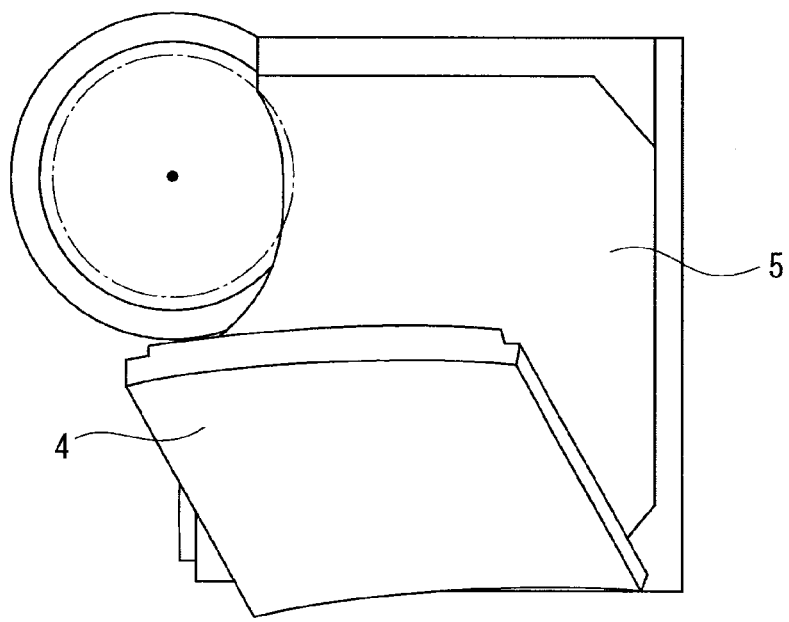

FIG. 16 is a diagram that illustrates an example where a part of a mirror 5 is cut off in accordance with a shape of a lens group A (LGA).

Figure 17:
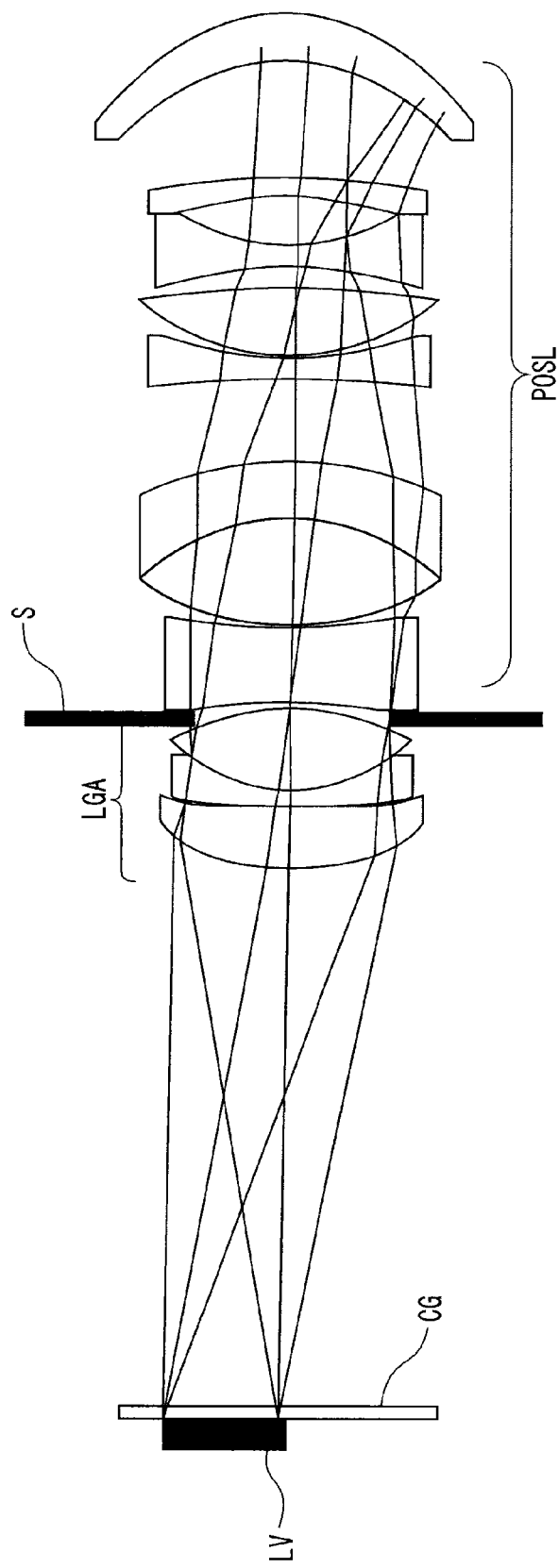

FIG. 17 is a diagram that illustrates a part of an optical arrangement of Embodiment 3.

FIG. 18 is a diagram that illustrates optical data of Embodiment 3.

FIG. 19 is a diagram that illustrates aspheric surface data of Embodiment 3.

Each of FIGS. 20A and 20B is a diagram that illustrates data of a mirror surface shape of a concave mirror of Embodiment 3.

DETAILED DESCRIPTION OF THE PREFERRED EMBODIMENTS

In an image display device according to the present invention, between a light valve and an aperture, a lens group A that includes equal to or more than one lens, and has a positive refractive power, and has low field curvature with respect to the light valve is placed.

The meaning that the lens group A having the positive refractive power has a low field curvature with respect to the light valve will be explained.

Firstly, with reference to FIG. 2, the low field curvature will be explained.

Figure 2:
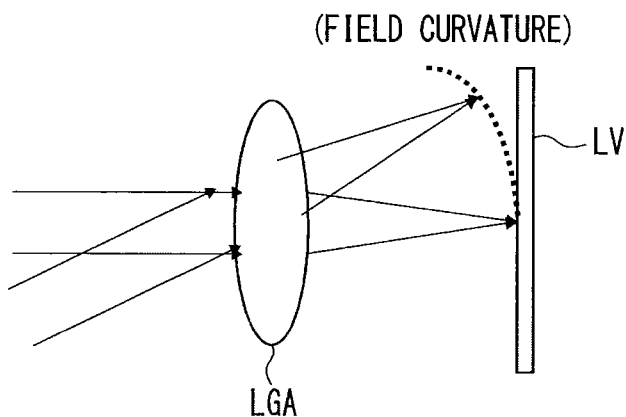
FIG. 2 is a diagram that explains low field curvature on a side of a light valve of a lens group A.

In FIG. 2, reference code LGA denotes a lens group A with a positive refractive power that is simplified, and reference code LV denotes a light valve as an image display element.

A luminous flux is incident to the lens group A from the left in FIG. 2. In order to simplify the explanation, a light beam that is incident is taken as a parallel luminous flux. At this time, if an image display surface of the light valve LV corresponds to a focal surface of the lens group A, an incident luminous flux is focused on the image display surface.

In a case where the incident luminous flux corresponds to an optical axis of the lens group A, or in a case where the incident luminous flux is inclined to the optical axis, if the luminous flux is focused on the image display surface by a focusing function of the lens group A, it is at the time when the lens group A has no field curvature.

On the other hand, if the lens group A has the field curvature, in accordance with an increase of an inclination angle with respect to an optical axis of the incident luminous flux, a light-focusing position separates from the image display surface. In FIG. 2, as illustrated by a dashed line, in accordance with the increase of the inclination angle, a case where the light-focusing position separates from the image display surface as it leans towards a side of the lens group A is a case where the field curvature of the lens group A is low with respect to the light valve.

That is, when the field curvature of the lens group A is low with respect to the light valve LV, a luminous flux inclined to the optical axis of the luminous flux that is incident on the lens group A from the left in FIG. 2 becomes diverging light after converging before the image display surface (side of the lens group A), and illuminates an area on the image display surface.

As to a relationship between the lens group A and the image display surface of the light valve LV, an optical axis of the lens group A is perpendicular to the image display surface in the center of the image display surface. Therefore, a distance between the lens group A and the image display surface is shortest at a position of the optical axis, and increases as it separates from the optical axis on the image display surface.

On the other hand, the field curvature of the lens group A on a side of the image display surface becomes lower as it separates from the optical axis, and the light-focusing position separates from the image display surface to the side of the lens group A.

A curved image plane is a light-focusing point by the lens group A, therefore low field curvature on a side of the light valve means a positive refractive power of the lens group A, that is, light-focusing power increases as the inclination angle from the optical axis increases. That is, an apparent focal length of the lens group A becomes shorter as it inclines to the optical axis.

Accordingly, by placing such a lens group A between the light valve LV and the aperture, it is possible to focus light from a peripheral part of an image display surface intensely, and to be incident on an entrance pupil (image of an aperture by the lens group A).

That is, a luminous flux incident to the lens group A from a central part of the image display surface becomes a parallel luminous flux when passing through the lens group A. However, as to a luminous flux incident on the lens group A from the peripheral part of the image display surface, an object distance to the lens group A becomes longer than the above apparent focal length of the lens group A, and therefore the luminous flux incident on the lens group A from the peripheral part of the image display surface becomes a converging luminous flux when passing through the lens group A, and a quantity of light incident on the entrance pupil increases.

Compared to a case where a position of a lens surface closest to a DMD corresponds to a position of an entrance pupil, and an aperture function is given to the lens surface closest to the DMD, which is disclosed in Japanese Patent number 3727543, it is possible to increase a quantity of light in an edge part of an image display surface more and introduce it into a projection optical system.

The above explanation is confirmed by the following simulations.

Figure 3:
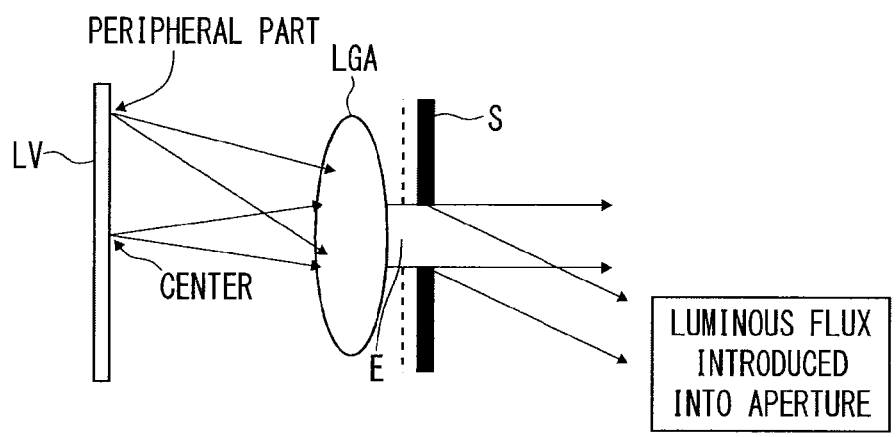
FIG. 3 is a diagram that explains simulation.
Figure 4:
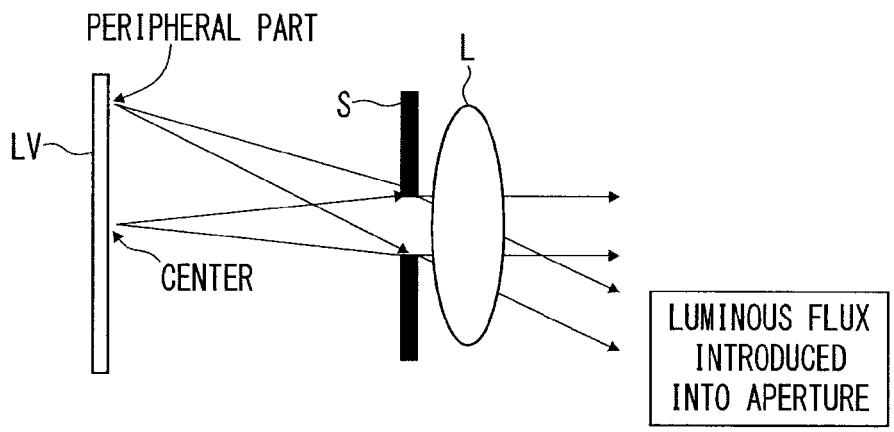
FIG. 4 is a diagram that explains simulation.

FIGS. 3 and 4 are referenced.

In FIGS. 3 and 4, each distance between the light valve LV and an entrance pupil E of the projection optical system equalizes, and the ratio between a quantity of light introduced into the entrance pupil from a luminous flux emitted from the center (a part corresponding to the optical axis of the lens group A and the projection optical system) of the light valve LV, and a quantity of light introduced into the entrance pupil from a luminous flux emitted from the edge part (peripheral part) of the light valve LV are compared.

In a constitution illustrated in FIG. 3, a distance between the light valve LV and a surface on an incident side of a lens of the lens group A: 42.08 mm, the center thickness of the lens group A: 7.18 mm, a material refractive index: 1.515, a curvature radius of a surface on a light valve LV side of a lens: 43.404, a curvature radius of a surface on an aperture S side of a lens: −16.784, a distance between the surface on the aperture S side of the lens and the aperture S: 1.6 mm, and a diameter of the entrance pupil: 19.8 mm.

The lens group A has low field curvature with respect to the light valve LV.

In FIG. 3, when a point light source is arranged in a part corresponding to the center of the light valve LV, light use efficiency of light (the number of light beams passing through the entrance pupil E) when passing a light beam with a divergence angle sufficient to pass through the entire entrance pupil of a luminous flux emitted from the point light source and light use efficiency of light from a point light source arranged in the edge part of the light valve LV (peripheral part at the distance of 6.92 mm from the center) are compared, and the light use efficiency of the light emitted from the center of the light valve LV is taken as 100%, the light use efficiency of the light emitted from the edge part is 98.2%.

In a constitution illustrated in FIG. 4, the lens group A is removed from the constitution illustrated in FIG. 3, a distance between the light valve LV and an opening part (entrance pupil E) of the aperture S: 50 mm, a diameter of the entrance pupil: 19.8 mm. Via the aperture S, light from the light valve LV is directly incident on a lens L that is a lens on a side closest to the light valve LV in the projection optical system.

When the same simulation as that in a case of the constitution illustrated in FIG. 3 is performed on the constitution illustrated in FIG. 4, and light use efficiency of light emitted from the center of the light valve LV is taken as 100%, light use efficiency of light from the edge part of the light valve LV is 97.4%.

This shows that it is possible to improve the light use efficiency by 0.8% by placing the lens group A having the field curvature between the light valve LV and the aperture S.

Note that the lens L is unrelated to the light use efficiency in the above simulations.

Hereinafter, specific embodiments will be explained.

Embodiment 1

An image display device according to Embodiment 1 will be explained specifically.

FIG. 5A illustrates a cross-sectional diagram on a plane parallel to a vertical direction (Y direction) and a normal direction (Z direction) of a screen SC as a projection surface. FIG. 5B illustrates a cross-sectional diagram on a plane parallel to a horizontal direction (X direction) and the normal direction (Z direction) of the screen SC.

Figure 1:
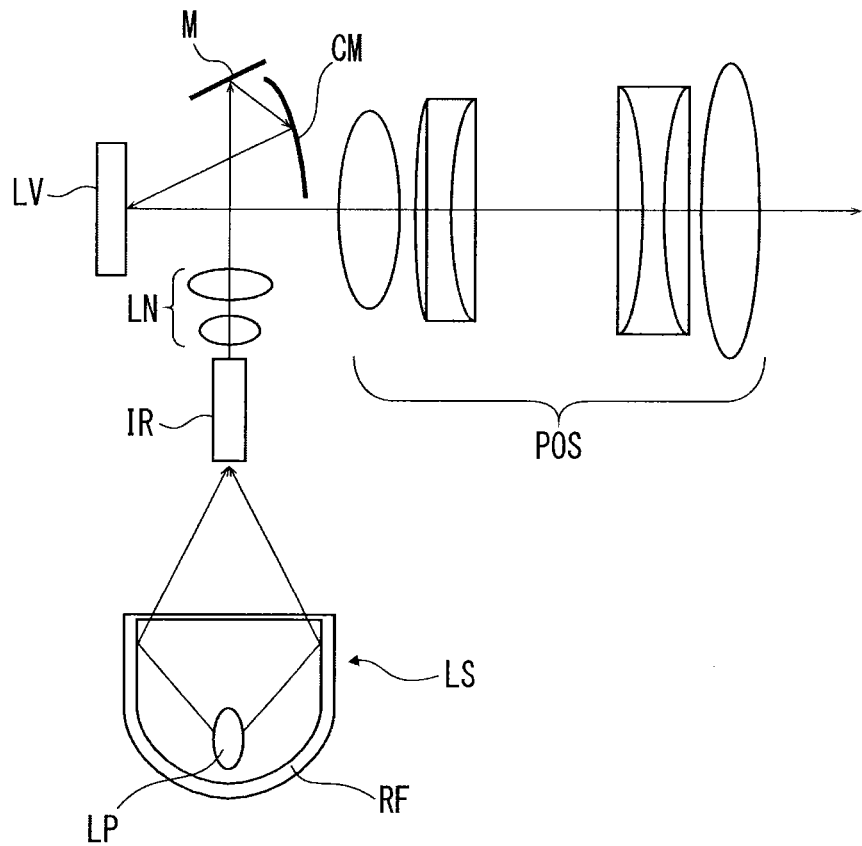
FIG. 1 is a diagram that explains a general projector.

In optical arrangements illustrated in FIGS. 5A and 5B, a part of the lamp light source and the illumination optical system, that is, a part corresponding to a part from the lamp light source LS to the curved-surface mirror CM illustrated in FIG. 1 is omitted, and a part from a part corresponding to a part from the light valve LV (as DMD) to the projection optical system POS illustrated in FIG. 1 to a screen SC via a plate-shaped dust-proof glass G as a dust-proof member is illustrated.

Reference code CNM denotes a concave mirror of the projection optical system.

In FIGS. 5A and 5B, a part between the light valve LV and the concave mirror CNM is a part constituted by a lens group A, an aperture, and a refractive optical system.

FIG. 6 illustrates a part of the light valve LV (including a cover glass CG), a lens group A (referred to as LGA), and a refractive optical system POSL of the projection optical system. The refractive optical system POSL, an aperture S, a lens group A, and the concave mirror CNM illustrated in FIGS. 5A and 5B constitute the projection optical system POS. The concave mirror CNM alone constitutes a mirror optical system in Embodiment 1.

A part of the lamp light source and the illumination optical system that are omitted from the drawing is the same as the part explained with reference to FIG. 1.

As explained with reference to FIG. 1, light emitted from the lamp light source illuminates the light valve LV as illumination light via the illumination optical system.

Light that is reflected by the image display surface of the light valve LV, and intensity-modulated by the lamp light source, as illustrated in FIG. 6, goes toward an entrance pupil (image of an aperture S by LGA), and is introduced into the refractive optical system POSL via the aperture S.

Most of the introduced light flux is effectively used for image display on the screen SC.

That is, when light from any positions on the image display surface of the light valve LV passes through the aperture S with the same quantity of light, and there is no "vignetting" inside the projection optical system POS, distribution of a quantity of light of the image on the screen gets close to be uniform.

However, as illustrated in FIGS. 5A and 5B, when an angle of a light beam incident on the dust-proof glass G from the concave mirror CNM is sharp on both of a Y-Z plane, and an X-Y plane, transmittance of a light beam flux toward a downside of an image projected and formed on the screen SC (an incident angle to the dust-proof glass G is large) transmitting the dust-proof glass G becomes a low level.

In this case, in a Y-Z cross-sectional plane (FIG. 5A), for example, as in FIG. 1 of Japanese Patent Application Publication number 2009-145672, it is possible to increase transmittance (improve uniformity of distribution of a quantity of light of an image plane) by inclining the dust-proof glass, and balancing an incident angle to the dust-proof glass of each light beam toward an upside and a downside of the image plane.

However, even though the dust-proof glass inclines as described above, in the X-Z plane of FIG. 5B the angle of the light beam toward the dust-proof glass G is not changed, and therefore it is difficult to avoid reducing the quantity of light in the edge part in the horizontal direction of the projected and formed image.

As illustrated in FIG. 6, the lens group A (LGA) having a positive refractive power is arranged, and due to a function of the low field curvature, it is possible to contribute to improvement of the uniformity of the distribution of the quantity of light on the screen SC by increasing a quantity of the introduced light of a pixel in the peripheral part of the image display surface (a pixel that is most distant from an optical axis of the refractive optical system POSL) more than that of a pixel in the center of the image display surface (a pixel that is closest to the optical axis), and making a state where the quantity of light from the peripheral part of the image is more than that from the center of the image at the time of passing through the aperture S.

At this time, if the number of lenses between the light valve LV and the aperture S is increased, the size in the radial direction of the lens naturally tends to be enlarged. And therefore there is a problem in interfering uniform illumination of the image display surface of the light valve LV, due to increase in size of an optical system or interference with an illumination optical system (interference with the curved-surface mirror CM in FIG. 1 and the LGA in FIG. 6).

In consideration of the above, it is preferable that the number of the lenses constituting the lens group A be the minimum number, that is, the minimum number that balances aberration correction of the projection optical system. It is preferable that one lens constitute the LGA, or as later-described in Embodiment 3, three lenses of positive, negative, and positive lenses constitute the LGA.

FIGS. 7 to 9B illustrate optical data of a part from the image display surface of the light valve LV (DMD) to the dust-proof glass G in Embodiment 1.

In FIG. 7, a curvature radius of each surface and a surface distance are expressed in units of mm, and a refractive index and Abbe number of material are expressed. As to an aperture, an aperture radius is expressed. Additionally, regarding a curvature radius, the curvature radius: 0.000 expresses the curvature radius: ∞, that is, the curvature radius: 0.000 expresses a flat surface.

Eccentricity Y is a shift amount to a negative side (downside in FIG. 5A) in the Y-direction (vertical direction illustrated in FIG. 5A) of an optical axis of the LGA and the refractive optical system POSL, and expressed in units of mm.

Eccentricity α is a shift amount to a plane including the optical axis (z direction) and a short direction of the light valve LV of the concave mirror CNM of the projection optical system and the dust-proof glass G, and expressed in units of mm.

Additionally, a black circle in a column of an aspherical surface denotes an aspherical surface.

In a column of a surface number, "LV (0)" denotes an image display surface of the light valve LV (DMD). Surface numbers "1, 2" denote surfaces of both sides of the cover glass CG. Surface numbers "3, 4" denote lens surfaces on an incident side and an output side of the LGA, and are both aspheric surfaces.

In a column of the curvature radius, "1.0E+18" denotes "1×10$^{18}$", and surfaces having the curvature radius of "1.0E+ 18" are substantive flat surfaces. A value of the curvature radius is, as to an aspherical surface, a paraxial curvature radius.

FIG. 8 illustrates aspherical surface data.

By use of paraxial curvature (a reciprocal number of a paraxial curvature radius): C, a conic constant: K, a high-order aspherical coefficient: $E_{2j}$ (j=2, 3, 4, 5, 6, 7, 8), a coordinate in a direction perpendicular to an optical axis: H, and a depth in an optical axis direction: D, the aspherical surface is expressed by a known expression, $$D=CH^2/[1+\sqrt{\{1-((1+K)C^2H^2)\}}]+\Sigma E_{2j}H^{2j}(j=1-8).$$

FIGS. 9A and 9B illustrate data of a mirror surface shape of the concave mirror CNM.

The mirror surface shape of the concave mirror CNM is "a free-form surface", and by use of a paraxial curvature radius on the optical axis: c, a conic constant: k, a high-order coefficient: Cj (j=2-72), a distance in a direction perpendicular to the optical axis: r, an amount of sag of a surface parallel to the optical axis: z, a coordinate in the X direction in FIGS. 5A and 5B: x, and a coordinate in the Y direction in FIGS. 5A and 5B: y, the mirror surface shape of the concave mirror CNM is given by the following expression.

$$z=cr^2/[1+\sqrt{\{1-(1+k)c^2r^2\}}]+\Sigma C_j x^m y^n (j=2-72)$$

In FIG. 9B, for example, "x**4*y**7", where the high-order coefficient is C40, expresses "$x^4 x y^7$".

Embodiment 2

FIGS. 10 to 12 illustrate an image display device according to Embodiment 2.

Embodiment 2 is an example where a fold mirror PM that is a flat mirror which folds a luminous flux is placed between the refractive optical system POSL and the concave mirror CNM in Embodiment 1, and a dust-proof mirror G is placed parallel to an image display surface of a light valve LV (DMD).

An LGA (lens group A), a refractive optical system POSL of a projection optical system, and a concave mirror CNM are the same as those in Embodiment 1. In Embodiment 2, the concave mirror CNM and the fold mirror PM constitute a mirror optical system.

In this embodiment, a lamp light source, an illumination light source (those are not illustrated), the light valve LV, the LGA, the concave mirror CNM, and the fold mirror PM are stored in a housing BX, and the dust-proof glass G is provided as a window of the housing BX.

FIG. 10 is a cross section in a y-z plane, FIG. 11 illustrates a constitution in the y-z plane, and FIG. 12 is a detailed diagram of an optical arrangement from the light valve LV to the dust-proof glass G.

By taking such a constitution as in Embodiment 2, for the reason of aberration correction of the projection optical system, it is possible to shorten a distance between the refractive optical system POSL and the concave mirror CNM which is difficult to be shortened, and contribute to downsizing of the housing BX that stores a projector.

In such a way, in a case of a constitution that folds a light path between the refractive optical system POSL and the concave mirror CNM, it is not possible to incline a dust-proof glass to an incident light beam as illustrated in FIG. 1 of Japanese Patent Application Publication number 2009-145672, and a decrease of a quantity of light in an edge part of an image plane on a screen SC becomes significant.

That is, as illustrated in FIG. 11, an angle of a light beam toward a downside of an image plane Im on the screen SC is very sharp to a surface of the dust-proof glass G.

Therefore, for example, when placing the dust-proof glass G to be inclined as illustrated in FIG. 13 (y-z plane), in FIG. 11 (y-z plane), a part of an area of the dust-proof glass G moves rightward in FIG. 11, and therefore the dust-proof glass G becomes large sharply, which is unfavorable in terms of weight, cost, and downsizing.

When moving the dust-proof glass G leftward in FIG. 11 (left direction in FIG. 13), in FIG. 13, the dust-proof glass G interferes with a light beam reflected by the fold mirror PM and going toward the concave mirror CNM.

That is, a constitution using the fold mirror PM is compelled to take a nearly close state to an angle as illustrated in FIG. 10.

Thus, even in a method using the fold mirror PM, increasing a quantity of peripheral light is important, and it is important to improve light use efficiency of light from a pixel in a peripheral part of the image display surface by low field curvature with respect to the light valve LV of the lens group A.

It is preferable that the low field curvature with respect to the light valve LV given to the lens group A be large so as to improve the light use efficiency of light from the pixel in the peripheral part. However, it is preferable to adopt an aspherical surface in the lens group A so as to balance an aberration correction ability of an entire projection optical system POS and a quantity of the field curvature of the lens group A.

In the above-described Embodiment 1, and Embodiment 2, which is a variation example of Embodiment 1, the lens group A (LGA) is a single convex lens, and surfaces on both sides are aspheric.

An example of a projection-type image display device (projector) using the above-described optical system of Embodiment 2 will be explained with reference to FIGS. 14 to 16.

Light emitted from a lamp light source 1 is focused on an entrance part of an integrator rod 2, multiply-reflected inside, and emitted from an exit part as a luminous flux where distribution of a quantity of light is evenly-uniformed.

A conjugate image of uniform distribution of the quantity of light in the exit part is formed on an image display surface of a light valve 7 as a DMD by a lens group for illumination 3, a mirror 4, and a curved-surface mirror 5. In FIG. 14, reference number 6 denotes a cover glass of the DMD.

Light reflected by the image display surface of the light valve 7 (Intensity is modulated by an image displayed on the image display surface) is incident on an optical system 8. An optical system 8 illustrated in FIG. 14 illustrates a combination of "a lens group A, an aperture, a refractive optical system, a fold mirror, and a concave mirror", and reference number 10 denotes a lens barrel that holds "the lens group A, the aperture, and the refractive optical system". Reference number 9 denotes a dust-proof glass.

In FIG. 15, reference number 8-1 denotes a lens system held by the lens barrel denoted by reference number 10 in FIG. 14. As the size in a diameter direction of each lens of the lens system 8-1 is small, a diameter of the lens barrel is also small.

As illustrated in FIG. 14, the curved-surface mirror 5 and the lens barrel 20 are closely arranged.

The above constitution is taken in order to downsize an illumination optical system; however, in a case of forming the integrator rod 2 into "a simple rectangular parallelepiped", the curved-surface mirror 5 blocks light toward the projection optical system from the light valve 7, and deteriorates a quantity of peripheral light.

Therefore, in an optical system where the lens group A is arranged between an aperture and a light valve, it is preferable that an optical element (lens or mirror) closest to the light valve 7 on a light path from the lamp light source 1 to the light valve 7 be cut off corresponding to an external shape of the lens group A.

FIG. 16 illustrates an example where a part of the curved-surface mirror 5 is cut off corresponding to the external shape of the lens barrel group A.

Embodiment 3

Embodiment 3 will be explained with reference to FIGS. 17 to 20B.

A concave mirror and a fold mirror are omitted from FIG. 17.

As illustrated in FIG. 17, in Embodiment 3, "three lenses of a positive lens, a negative lens, and a positive lens" in order from a side of a light valve LV (DMD) constitute a lens group A (referred to as LGA), which is a preferable constitution for aberration correction (high symmetry in an optical system).

Reference code S denotes an aperture, and reference code POSL denotes a refractive optical system.

Among the three lenses constituting the LGA, a diameter of the positive lens closest to the light valve LV (DMD) becomes larger, compared to cases in the above-described Embodiments 1 and 2 (one lens constitutes the LGA). Therefore, there may be a possibility of interference with the curved-surface mirror 5 illustrated in FIG. 14. However, in a case of putting more emphasis on aberration correction than on distribution of a quantity of light on a screen, such a constitution is also possible.

FIGS. 18, 19, 20A, and 20B describe specific optical data in the same manner as those in Embodiment 1.

In FIG. 18, data of a curvature radius of each surface, a surface distance, material, and so on are expressed, and in FIG. 19, aspherical surface data is expressed, and in FIGS. 20A and 20B, data regarding a mirror surface shape of a concave mirror is expressed. FIGS. 18, 19, 20A, and 20B are expressed in the same manner as FIGS. 7, 8, 9A, and 9B, respectively.

As described above, in embodiments of the present invention, in an image display device performing ultra-close-range projection, using a concave mirror in a projection optical system makes it easy to arrange a dust-proof glass, arranging a fold mirror if necessary makes it possible to downsize a housing that stores an optical system, and using a lens group A having low field curvature makes it possible to improve a decrease of a quantity of peripheral light due to the dust-proof glass or the fold mirror and the dust-proof glass.

As in Embodiments 1 and 2, one convex lens constitutes a lens group A, which is effective to downsize an image display device. And at least one surface of a positive lens of equal to or more than one lens constituting a lens group A has an aspherical shape, and an aspherical surface of the positive lens has a shape that functions to make field curvature lower than a spherical shape having a paraxial curvature radius, which is effective to improve a function of the lens group A.

As in Embodiment 2, a flat fold mirror is provided on a light path between a concave mirror of a mirror optical system and a refractive optical system, and in this case, a plate-shaped dust-proof glass is arranged such that a plate surface of the dust-proof glass is parallel to an image display surface of a light valve, which is effective to downsize the image display device.

As described above, on a light path from a lamp light source to a light valve, a lens or a mirror closest to the light valve is cut off corresponding to an external shape of a lens group A, which is greatly effective to improve deterioration of a quantity of peripheral light of an image displayed on a screen.

Additionally, the lens group A is fixed when zooming and focusing are performed, which is obviously preferable to simplify and downsize a zooming mechanism.

According to embodiments of the present invention, an image display device in which a lens group A is arranged between a light valve and an aperture has a positive refractive power, and has low field curvature with respect to the light valve, which makes it possible to reduce a difference between a quantity of light toward a projection optical system from the center of the light valve and a quantity of light toward the projection optical system from an edge part of the light valve, and effectively increase brightness in a peripheral part of a projected image.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A projection optical system that is used for an image display device having an image display element, comprising:
   a refractive optical system that includes a plurality of lenses;
   an aperture that limits a quantity of light led to the refractive optical system from the image display element;
   a lens group that is arranged between the image display element and the aperture, has a positive refractive power, and has low field curvature with respect to the image display element; and
   a mirror optical system that has a concave mirror arranged on an opposite side from the image display element across the refractive optical system, the aperture, and the lens group.

2. The projection optical system according to claim 1, wherein one convex lens constitutes the lens group.

3. The projection optical system according to claim 1, wherein from a side of the image display element, three lenses arranged in order of a positive lens, a negative lens, and a positive lens constitute the lens group.

4. The projection optical system according to claim 2, wherein at least one surface of a positive lens constituting the lens group has an aspherical shape, and an aspherical surface of the positive lens has a shape that functions to make field curvature lower than a spherical shape having a paraxial curvature radius.

5. The projection optical system according to claim 3, wherein at least one surface of a positive lens constituting the lens group has an aspherical shape, and an aspherical surface of the positive lens has a shape that functions to make field curvature lower than a spherical shape having a paraxial curvature radius.

6. The projection optical system according to claim 1, comprising:
   a flat mirror on a light path between the concave mirror and the refractive optical system.

7. The projection optical system according to claim 1, wherein the lens group is fixed when zooming and focusing are performed.

8. An image display device comprising:
   an image display element;
   a light source;
   an illumination optical system that leads light emitted from the light source to the image display element;
   a projection optical system that projects an image displayed on the image display element and forms the image; and
   a dust-proof member that is provided on a side of the projection optical system where an imaging luminous flux is emitted,
   the projection optical system including:
      a refractive optical system that includes a plurality of lenses;
      an aperture that limits a quantity of light led to the refractive optical system from the image display element;
      a lens group that is arranged between the image display element and the aperture, has a positive refractive power, and has low field curvature with respect to the image display element; and
      a mirror optical system that has a concave mirror arranged on an opposite side from the image display element across the refractive optical system, the aperture, and the lens group.

9. The image display device according to claim 8, wherein one convex lens constitutes the lens group.

10. The image display device according to claim 8, wherein from a side of the image display element, three lenses arranged in order of a positive lens, a negative lens, and a positive lens constitute the lens group.

11. The image display device according to claim 9, wherein at least one surface of a positive lens constituting the lens group has an aspherical shape, and an aspherical surface of the positive lens has a shape that functions to make field curvature lower than a spherical shape having a paraxial curvature radius.

12. The image display device according to claim 10, wherein at least one surface of a positive lens constituting the lens group has an aspherical shape, and an aspherical surface of the positive lens has a shape that functions to make field curvature lower than a spherical shape having a paraxial curvature radius.

13. The image display device according to claim 8, comprising:
   a flat mirror on a light path between the concave mirror and the refractive optical system.

14. The image display device according to claim 13, wherein the dust-proof member is a plate-shaped member, and a plate surface of the dust-proof member is arranged parallel to an image display surface of the image display element.

15. The image display device according to claim 8, wherein the lens group is fixed when zooming and focusing are performed.

16. The image display device according to claim 8, wherein a lens or a mirror closest to the image display element on a light path from the light source to the image element is cut off corresponding to an external shape of the lens group.

17. An image display device comprising:
   a reflection-type light valve;
   a lamp light source that illuminates the light valve;
   an illumination optical system that leads light emitted from the lamp light source to the light valve;
   a projection optical system that projects an image displayed on the light valve and forms the image; and
   a dust-proof member that is provided on a side of the projection optical system where an imaging luminous flux is emitted,
   the projection optical system including:
      a refractive optical system that includes a plurality of lenses;

an aperture that limits a quantity of light led to the refractive optical system from the light valve;
a lens group that is arranged between the light valve and the aperture, has a positive refractive power, and has low field curvature with respect to the light valve; and
a mirror optical system that has a concave mirror arranged on an opposite side from the light valve across the refractive optical system, the aperture, and the lens group.

* * * * *